(12) United States Patent
Ni et al.

(10) Patent No.: US 11,469,685 B2
(45) Date of Patent: Oct. 11, 2022

(54) FILTER AND AFE POWER CELL PHASE CONTROL

(71) Applicant: Rockwell Automation Technologies, Inc., Mayfield Heights, OH (US)

(72) Inventors: Zhituo Ni, Hamilton (CA); Mehdi Narimani, Kitchener (CA); Zhongyuan Cheng, Kitchener (CA); Navid R. Zargari, Kitchener (CA)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 0 days.

(21) Appl. No.: 17/128,358

(22) Filed: Dec. 21, 2020

(65) Prior Publication Data
US 2022/0200479 A1 Jun. 23, 2022

Related U.S. Application Data

(63) Continuation of application No. 16/546,911, filed on Aug. 21, 2019.

(51) Int. Cl.
| | |
|---|---|
| *H02M 7/00* | (2006.01) |
| *H02M 7/483* | (2007.01) |
| *H02M 5/458* | (2006.01) |
| *H02M 7/5387* | (2007.01) |

(Continued)

(52) U.S. Cl.
CPC .......... *H02M 7/483* (2013.01); *H02M 1/126* (2013.01); *H02M 5/4585* (2013.01);
(Continued)

(58) Field of Classification Search
CPC .. H02M 7/483; H02M 7/53871; H02M 1/126; H02M 1/0003; H02M 7/4835;
(Continued)

(56) References Cited

U.S. PATENT DOCUMENTS 6,236,580 B1    5/2001    Aiello
6,301,130 B1    10/2001   Aiello
(Continued)

FOREIGN PATENT DOCUMENTS

CN          103427416 B       6/2016

OTHER PUBLICATIONS

Extended European Search Report issued from the European Patent Office dated Dec. 9, 2020 (pp. 1-7).
(Continued)

*Primary Examiner* — Adolf D Berhane

(57) ABSTRACT

Power conversion systems and methods to control a multi-phase multilevel regenerative power converter with multi-level phase circuits that individually include multiple regenerative power stages with respective power stage outputs connected in series, each of the multiple regenerative power stages comprising a DC link circuit a switching rectifier coupled between a respective transformer secondary circuit and the DC link circuit, and a switching inverter coupled between the DC link circuit and the respective power stage output, including a controller that provides inverter switching control signals to control the respective switching inverters, provides rectifier switching control signals to control the respective switching rectifiers, and controls a non-zero phase relationship between the rectifier switching control signals of the respective switching rectifiers.

17 Claims, 13 Drawing Sheets

(51) Int. Cl.
*H02M 1/12* (2006.01)
*H02M 1/00* (2006.01)

(52) U.S. Cl.
CPC ...... *H02M 7/53871* (2013.01); *H02M 1/0003* (2021.05); *H02M 7/4835* (2021.05)

(58) Field of Classification Search
CPC .......... H02M 5/45; H02M 1/00; H02M 5/451; H02M 5/4585; H02M 5/452; H02M 5/44; H02M 1/08; H02M 1/44; H02M 1/36; H02P 27/08; H02P 6/14
See application file for complete search history.

(56) References Cited

U.S. PATENT DOCUMENTS

| | | | |
|---|---|---|---|
| 10,050,534 B1* | 8/2018 | Murthy-Bellur | H02M 3/33584 |
| 11,211,879 B2* | 12/2021 | Abuelnaga | H02P 21/22 |
| 2003/0231517 A1* | 12/2003 | Bixel | H02M 5/4585 363/71 |
| 2005/0231285 A1* | 10/2005 | Takasawa | H03G 3/3036 330/278 |
| 2007/0058405 A1 | 3/2007 | Bousfield, III | |
| 2013/0279215 A1* | 10/2013 | Skjellnes | H02M 7/1626 363/37 |
| 2015/0349649 A1* | 12/2015 | Zane | H02M 3/33592 363/21.03 |
| 2017/0366082 A1 | 12/2017 | Liu | |
| 2021/0058003 A1* | 2/2021 | Ni | H02M 1/08 |

OTHER PUBLICATIONS

Communication pursuant to Article 94(3) issued from the European Patent Office on European Application No. 20186722.3 dated Jul. 1, 2022 (6 pages).

* cited by examiner

FILTER AND AFE POWER CELL PHASE CONTROL

CROSS-REFERENCE TO RELATED APPLICATIONS

This application is a continuation of, and claims priority to, U.S. patent application Ser. No. 16/546,911, filed on Aug. 21, 2019, and entitled "FILTER AND AFE POWER CELL PHASE CONTROL." The entirety of the related patent application is incorporated herein by reference.

BACKGROUND

The disclosed subject matter relates to multilevel power conversion systems.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. Multiphase multilevel regenerative power converters are described with multilevel phase circuits that individually include multiple regenerative power stages with respective power stage outputs connected in series, each of the multiple regenerative power stages comprising a DC link circuit a switching rectifier coupled between a respective transformer secondary circuit and the DC link circuit, and a switching inverter coupled between the DC link circuit and the respective power stage output, including a controller that provides inverter switching control signals to control the respective switching inverters, provides rectifier switching control signals to control the respective switching rectifiers, and controls a non-zero phase relationship between the rectifier switching control signals of the respective switching rectifiers.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

DETAILED DESCRIPTION

Figure 1:
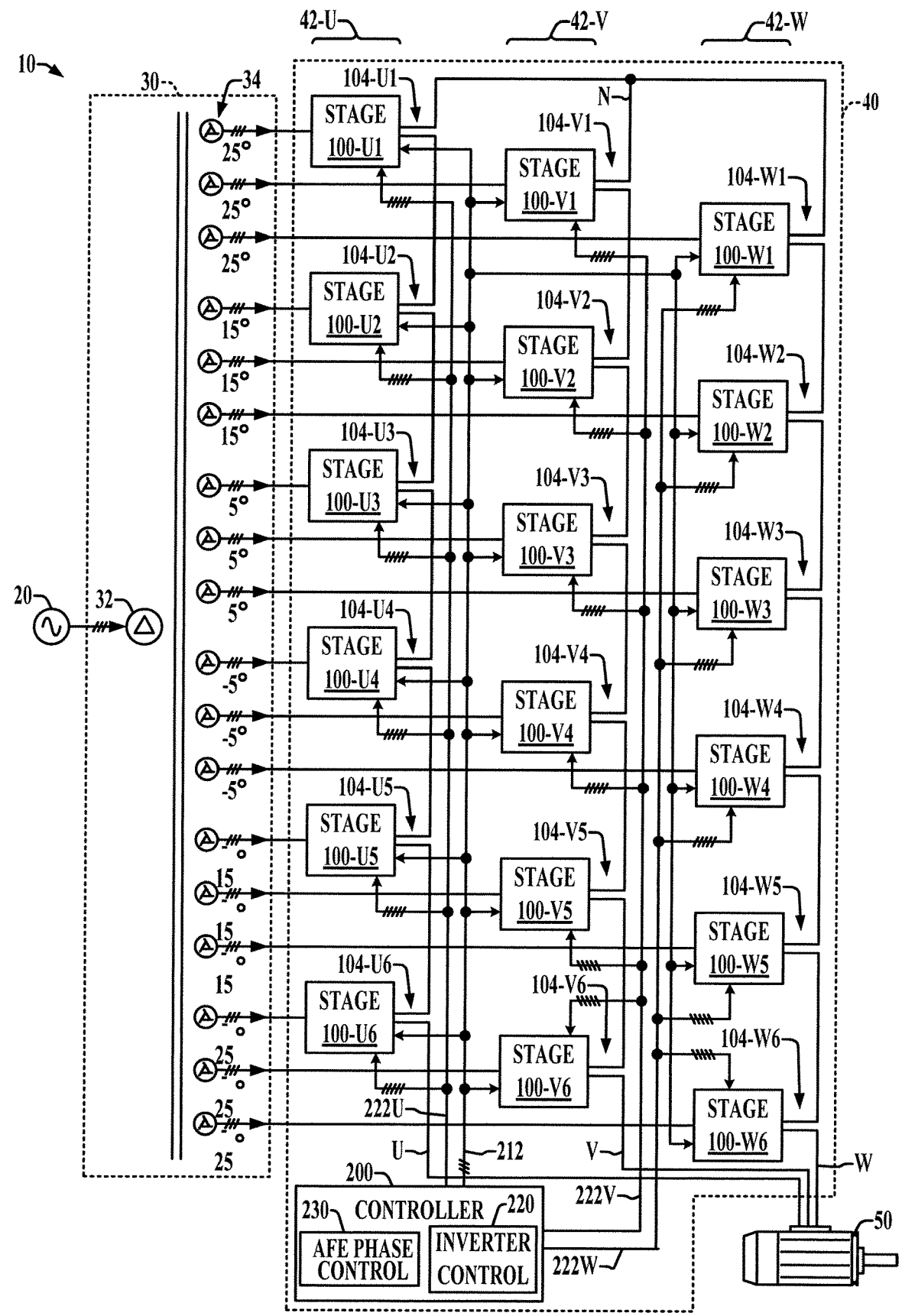
FIG. 1 is a schematic diagram.

Referring now to the figures, several embodiments or implementations are hereinafter described in conjunction with the drawings, wherein like reference numerals are used to refer to like elements throughout, and wherein the various features are not necessarily drawn to scale. Multilevel inverters are sometimes employed in motor drives and other power conversion applications to generate and provide high voltage drive signals to a motor or other load in high power applications. One form of multilevel inverter is a cascaded H-bridge (CHB) inverter architecture, which employs multiple series-connected power stages such as H-Bridge inverters for driving each motor winding phase. Each H-Bridge is powered by a separate DC source and is driven by switch signals to generate positive or negative output voltage, with the series combination of multiple H-Bridge stages providing multilevel inverter output capability for driving a load. Regenerative power converters provide benefits in a variety of applications, such as grid-tied motor drives.

Figure 2:
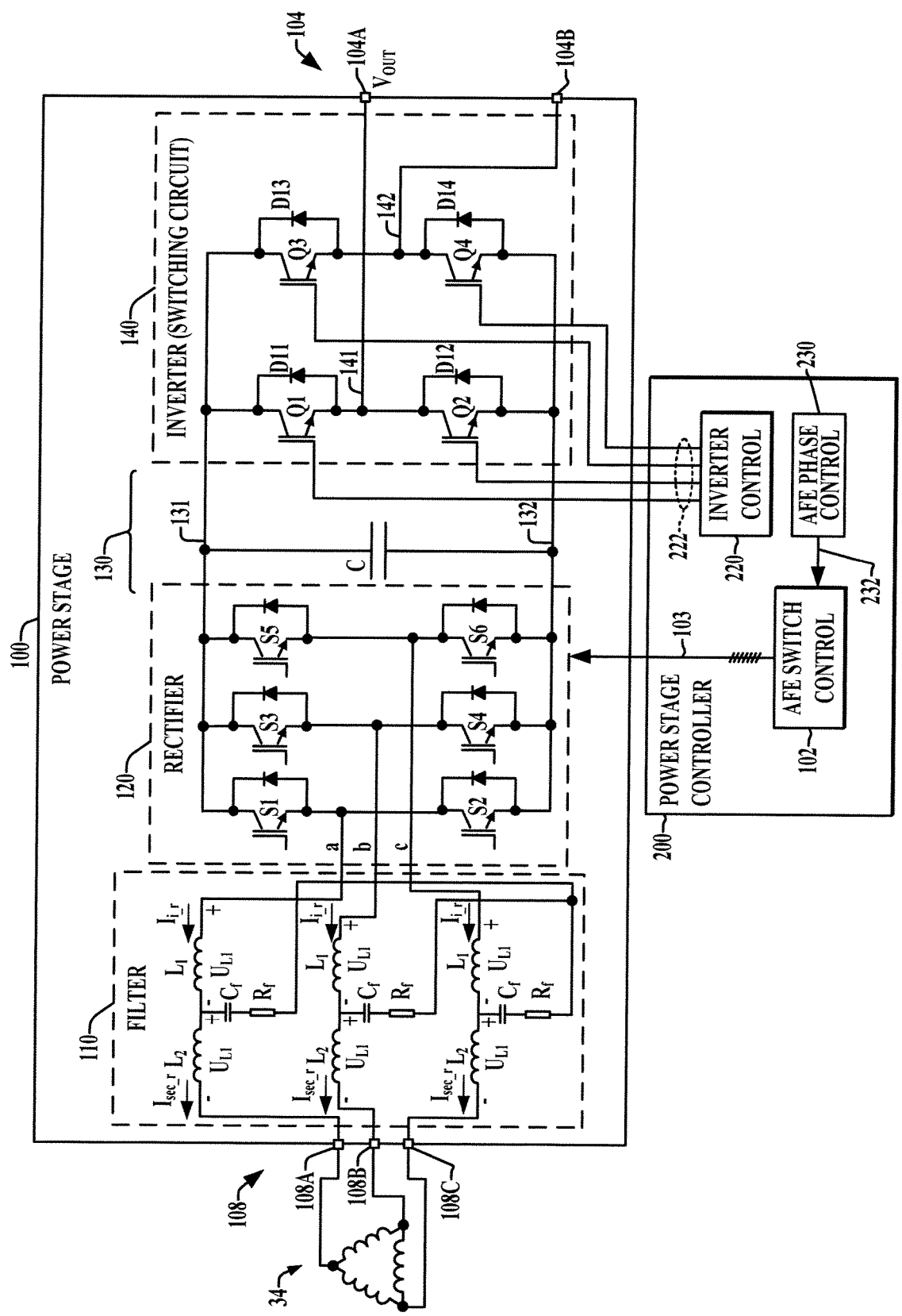
FIG. 2 is a schematic diagram.

FIGS. 1 and 2 illustrate an example multilevel inverter motor drive power conversion system 10 with a three-phase multilevel power converter 40. The with series-connected power stages 100-1, 100-2, 100-3, 100-4, 100-5, 100-6 for each of three sections associated with the motor phases U, V and W of a motor load 50. Other embodiments are possible in which other forms of load 50 are driven, wherein the present disclosure is not limited to motor drive type power converters. In certain embodiments, the individual power stages 100 include an H-bridge switching circuit or inverter 140 with switching devices (e.g., Q1-Q4 in FIG. 2 below), although any suitable form of switching circuit 140 may be provided in the individual power stages 100 for generating a power stage output having one of two or more possible levels according to switching control signals 222 provided by an inverter control component 220 of a power converter controller 200.

The example of FIG. 1 is a multiphase 13-level power converter 40 with six power stages 100 for each of three motor load phases U, V and W (e.g., 100-U1, 100-U2, 100-U3, 100-U4, 100-U5 and 100-U6 for phase U; 100-V1, 100-V2, 100-V3, 100-V4, 100-V5 and 100-V6 for phase V; and power stages 100-W1, 100-W2, 100-W3, 100-W4, 100-W5, 100-W6 for phase W). However, the various aspects of the present disclosure may be implemented in association with single phase or multiphase, multilevel power conversion systems having any integer number "m" power stages 100, where m is greater than one. In addition, although the illustrated embodiments utilize H-Bridge power stages 100 cascaded to form multilevel power converters 40 for each phase of the motor drive system 10, other types and forms of power stages 100 can be used, such as a power stage 100 with a switching circuit having more or less than four switching devices, wherein the broader aspects of the present disclosure are not limited to H-Bridge power stages shown in the illustrated embodiments. For instance, embodiments are possible, in which the individual power stages may include as few as two switching devices or any integer number of output switches greater than equal to two.

The power converter 10 in FIG. 1 is supplied with multiphase AC input power from a phase shift transformer 30 having a multiphase primary circuit 32 (a delta configuration in the illustrated embodiment) receiving three-phase power from an AC power source 20. The transformer 30 includes 18 three-phase secondary circuits 34, with six sets of three delta-configured three-phase secondary circuits 34, with each set being at a different phase relationship, although not a strict requirement of all possible implementations. Although the primary circuit 32 and the secondary circuits 34 are configured as delta windings in the illustrated example, "Y" connected primary windings and/or secondary windings can alternatively be used alone or in combination with delta windings. In addition, while the transformer has three-phase primary and secondary windings 32, 34, other single or multiphase implementations can be used. In addition, the various secondary circuits 34 in the illustrated embodiments are phase shifted, although non-phase shifted embodiments are possible.

Each of the three-phase secondary circuits 34 in the example of FIG. 1 is coupled to provide AC power to drive a three-phase rectifier 120 of a corresponding power stage 100 of the three-phase multilevel inverter 40. The power converter 40 is a 13-level inverter for motoring operation, with six cascaded H-Bridge power stages 100U-1 through 100U-6 having outputs 104U-1 through 104U-6 connected in series with one another (cascaded) between a motor drive neutral point or other reference node N and a first winding U of a three-phase motor load 50. Six power stages 100V-1 through 100V-6 provide series connected voltage outputs 104V-1 through 104V-6 between the neutral N and the second winding V, and six power stages 100W-1 through 100W-6 provide series connected voltage outputs 104W-1 through 104W-6 between the neutral N and the third winding W of the motor load 50. The controller 200 provides control signals 222U to the power stages 100U-1 through 100U-6 associated with the first motor winding U, and also provides control signals 222V to the power stages 100V-1 through 100V-6 and control signals 222W to the power stages 100W-1 through 100W-6. The controller 200 includes an inverter controller 220 and an AFE phase controller 230 to control a non-zero phase relationship between the rectifier switching control signals of respective switching rectifiers of the power stages 100.

As further shown in FIG. 2, power stages 100 are provided for use as the power stages of single or multi-phase multilevel power converters 40, with a local AFE phase controller 230 in one example. The controller 200 and its components 230, 240 can be implemented using any suitable hardware, processor executed software or firmware, or combinations thereof, wherein an example of the controller 200 includes one or more processing elements such as microprocessors, microcontrollers, DSPs, programmable logic, etc., along with electronic memory, non-transitory computer readable medium such as a program memory and signal conditioning driver circuitry, with the processing element(s) programmed or otherwise configured to implement an inverter controller 220 to generate signals 222 suitable for operating the inverter switching devices of the power stage inverter switching circuit 140. In addition, the illustrated controller 200 includes an AFE rectifier control component 102 that generates rectifier switching control signals 103 to operate rectifier switching devices of the rectifier 120. The local AFE phase controller 230 in one example cooperative operates with phase controllers 230 of other power stages 100 to control a non-zero phase relationship between the rectifier switching control signals 103 of respective switching rectifiers of the power stages 100.

FIG. 2 illustrates one example H-Bridge power stage 100 with a power stage filter 110, an active front end (AFE) switching regulator 120, a DC bus circuit 130 and an output H-bridge inverter 140. The power stage in FIG. includes an AC input 108 with input terminals 108A, 108B and 108C connectable to receive AC input power, in this case three-phase power from an AC source through a secondary circuit 34 of the transformer 30 in FIG. 1. The AC input power is provided from the terminals 108 through the power stage filter 110 to the switching rectifier circuit 120 having onboard rectifier switching devices S1-S6 (e.g., IGBTs) forming a three-phase active rectifier 120 which receives three-phase AC power from the corresponding transformer secondary circuit 34.

The power cell stage 100 also includes a DC link circuit 130 and a switching circuit (e.g., inverter 140) providing an output voltage $V_{OUT}$ to a power stage output 104 having first and second output terminals 104A and 104B. In the illustrated embodiment, the switching rectifier 120 provides DC power across a DC capacitor C connected between DC link terminals 131 and 132 of the DC link circuit 130. The DC link circuit 130, in turn, provides an input to an H-Bridge inverter 140 formed by four inverter xc switching devices Q1-Q4 (e.g., IGBTs) configured in an "H" bridge circuit. Moreover, any suitable type of switching devices Q may be used in the power stages 100, including without limitation semiconductor-based switches such as insulated gate bipolar transistors (IGBTs), silicon controlled rectifiers (SCRs), gate turn-off thyristors (GTOs), integrated gate commutated thyristors (IGCTs), etc.

The H-bridge implementation in FIG. 2 allows selective switching control signal generation by the controller 200 to provide at least two distinct voltage levels at the output 104 in a controlled fashion. For instance, a voltage is provided at the output terminals 104A and 104B of a positive DC level substantially equal to the DC bus voltage across the DC link capacitor C (e.g., +VDC) when the switching devices Q1 and Q4 are turned on (conductive) while the other devices Q2 and Q3 are off (nonconductive). Conversely, a negative output is provided when Q2 and Q3 are turned on while Q1 and Q4 are off (e.g., −VDC). Accordingly, the power stage 100 allows selection of two different output voltages, and the cascaded configuration of six such stages (e.g., FIG. 1) allows selective switching control signal generation by the inverter control component 220 to implement 13 different voltage levels for application to the corresponding motor phase U, V or W. Other possible switching circuitry may be used to implement a two, three, or K-level selectable output for individual power stages 100, where K is any positive integer greater than 1. Any suitable logic or circuitry in the controller 200 can be used for providing inverter switching control signals 222 to a given power stage 100, 400, where the controller 200 may also include signal level amplification and/or driver circuitry (not shown) to provide suitable drive voltage and/or current levels sufficient to selectively actuate the switching devices Q1-Q4, for instance, such as comparators, carrier wave generators or digital logic and signal drivers.

Figure 3:
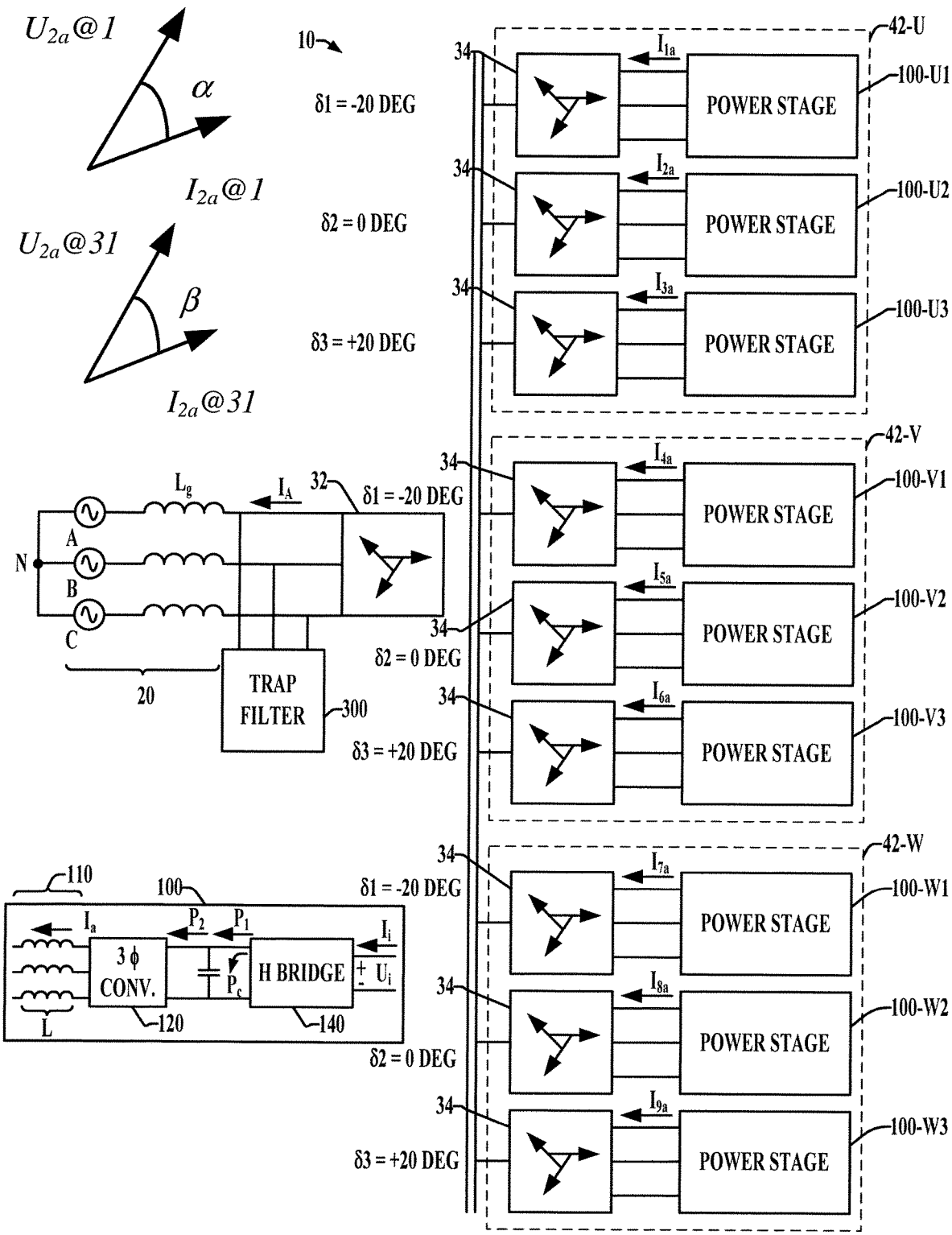
FIG. 3 is a schematic diagram.
Figure 7:
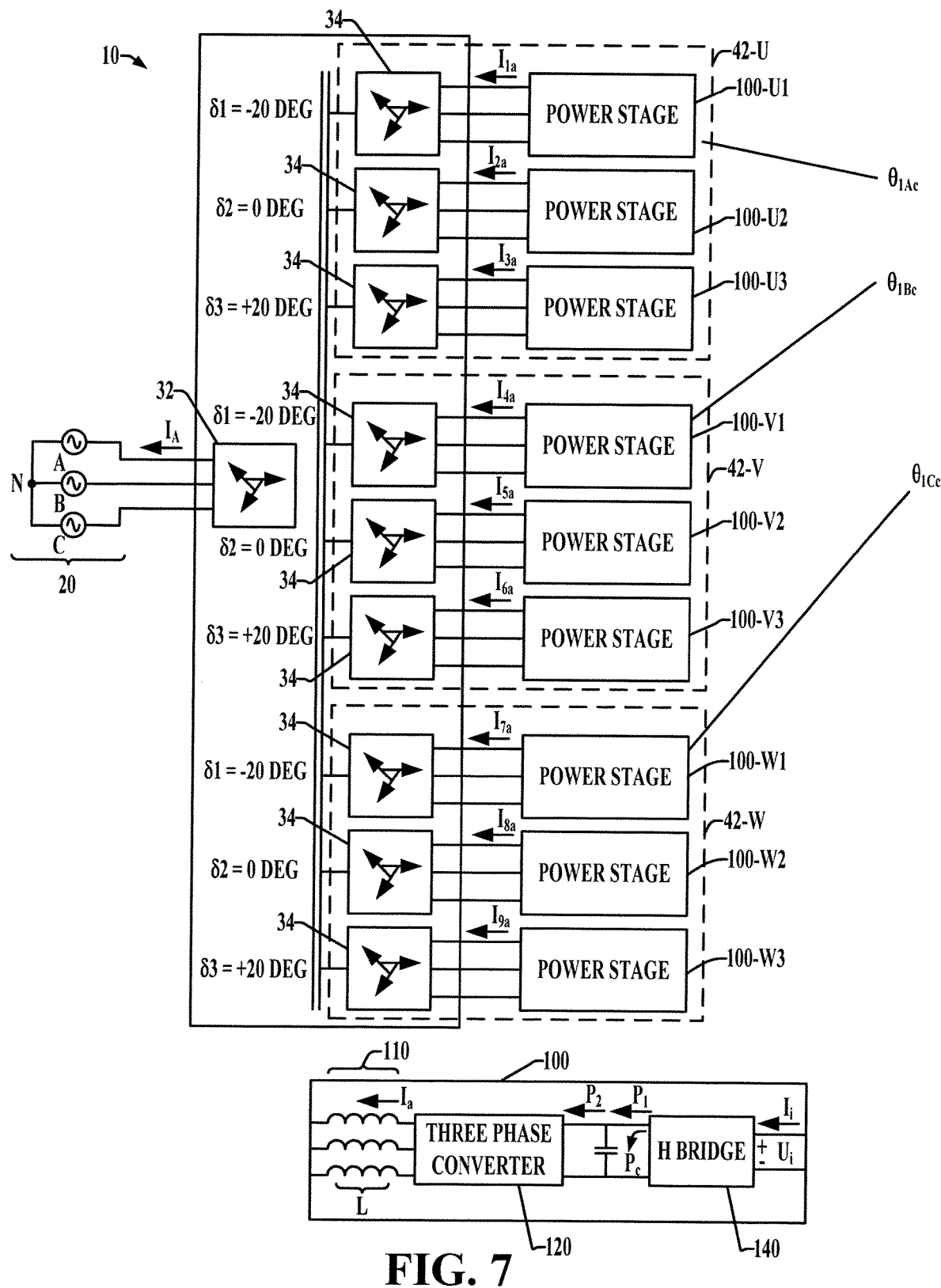
FIG. 7 is a schematic diagram.
Figure 12:
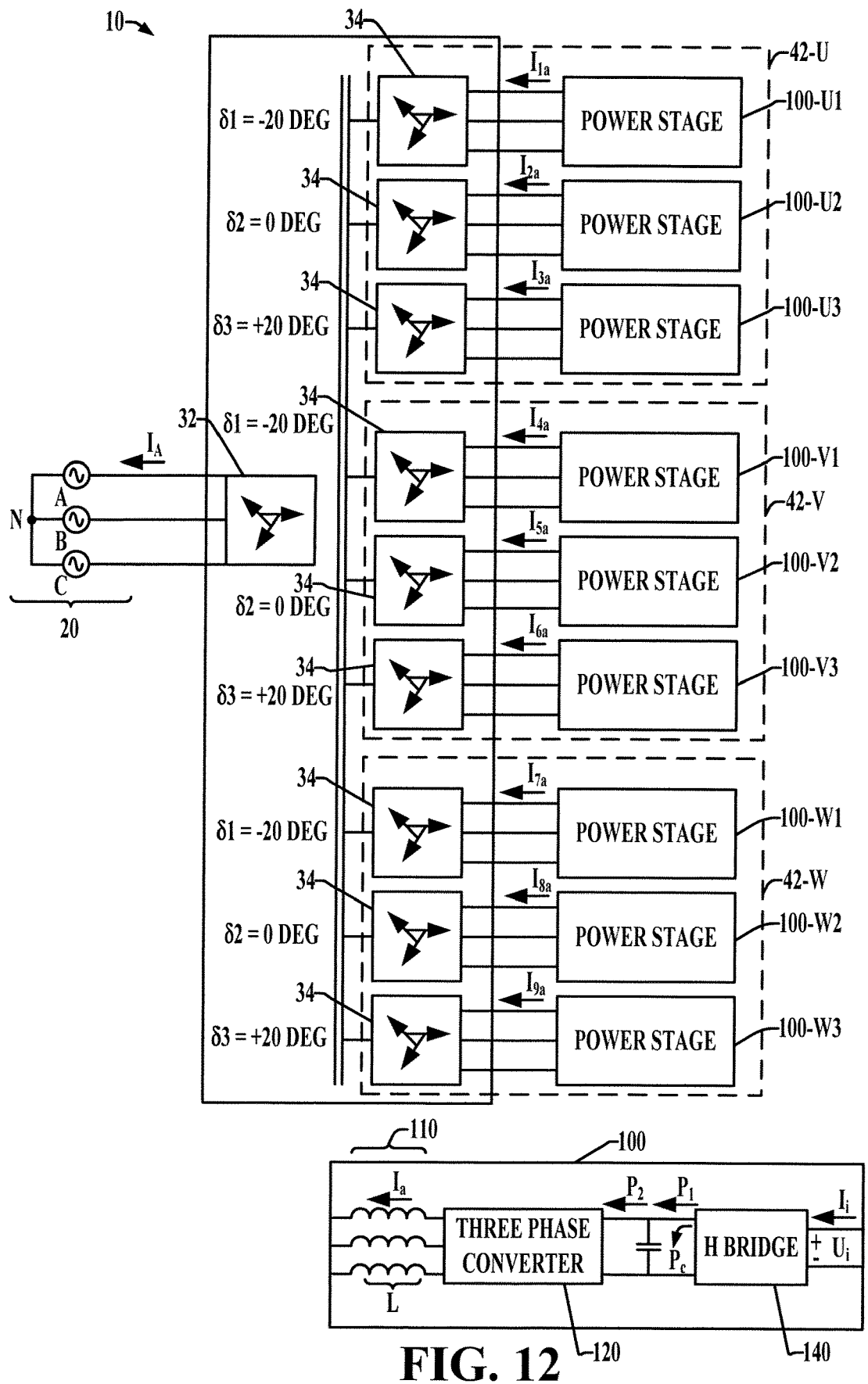
FIG. 12 is a schematic diagram.

The power stage filter 110 in the example of FIG. 2 includes an LCL circuit for each of the three AC phases, including a first inductor $L_1$, a second inductor $L_2$, a filter capacitor $C_f$ and a damping resistor $R_f$. In other examples, the power stage filter can be omitted or replaced with simple inductor filters with a single inductor in each of the three AC lines (e.g., as shown in FIGS. 3, 7 and 12 below). The use of a simple single inductor filter approach reduces the cost, size and weight of the multi-phase multilevel power converters 40. The example converter 40 provides active front end rectifier switching operation with controlled non-zero phase relationships to control harmonics in the system 10, and can facilitate simplification and/or removal of the power stage filter circuit 110. Certain examples include an additional trap filter between the AC power source 20 and the primary circuit 32 of the transformer 30 (e.g., FIG. 3 below). Other examples do not require a trap filter (e.g., FIGS. 7, 12 and 14 below).

Figure 4:
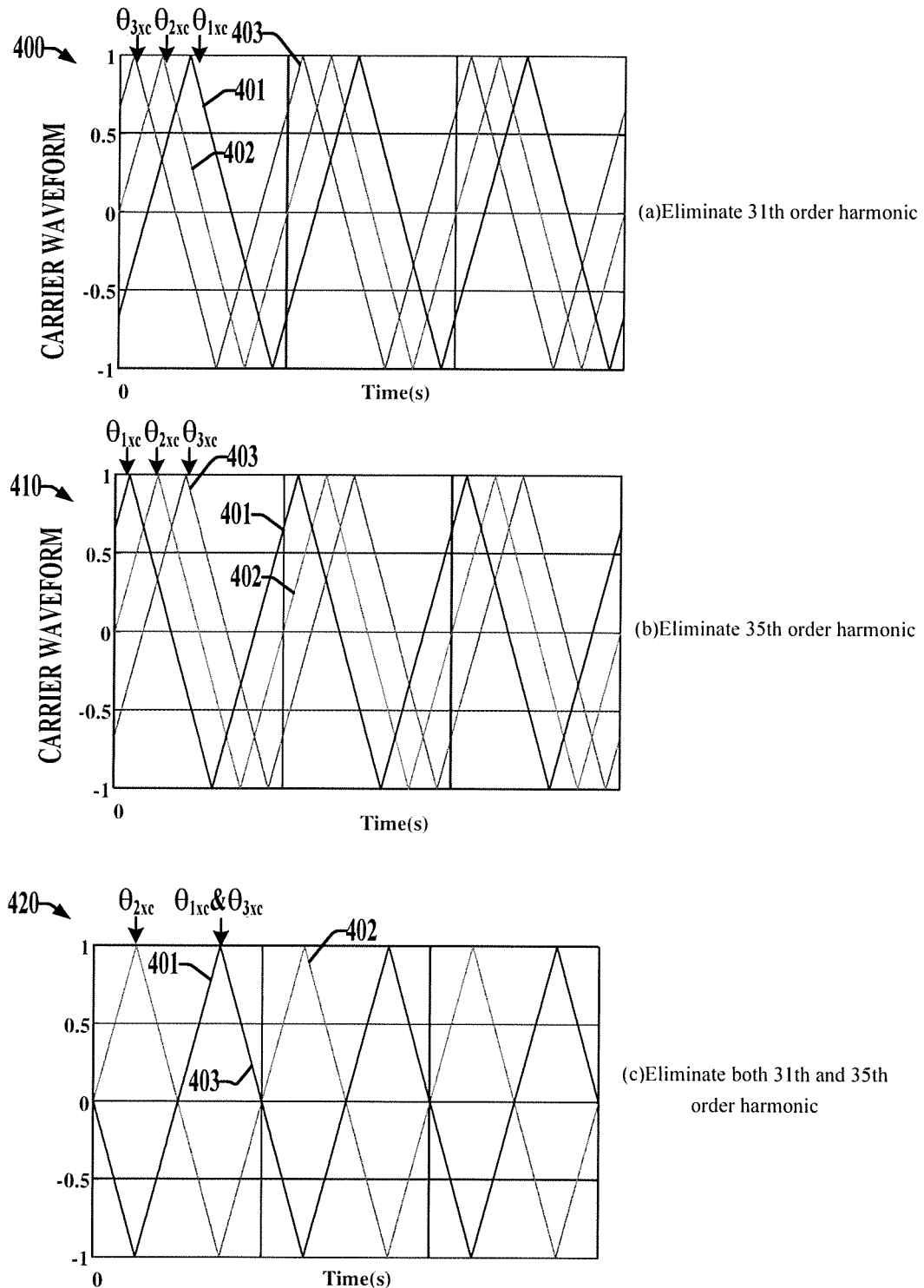
FIG. 4 is a signal diagram.

Referring also to FIGS. 3 and 4, FIG. 3 shows another example of the multi-phase multilevel power converter 40, including a trap filter 300 connected between the source 20 and the transformer 30, such as a three phase LCL circuit, with or without damping resistors. In addition, the system 10 of FIG. 3 includes the transformer 30 with the primary circuit 32 and the secondary circuits 34, and the multiphase multilevel regenerative power converter 40. The converter 40 includes three multilevel phase circuits 42. The individual phase circuits 42 include three regenerative power stages 100 for 7-level output operation of each phase (power stages 100U-1 through 100U-3 for phase U, 100W-1 through 100W-3 for phase V, and 100W-1 through 100W-3 for phase W) with respective power stage outputs 104 connected in series. FIG. 3 also schematically illustrates an example of one of the individual power stages 100, including an optional power stage filter 110, the active front and switching rectifier 120 (e.g., including rectifier switching devices S1-S6 connected as shown in FIG. 2 between a respective one of the secondary circuits 34 and a respective one of the first and second DC link nodes 131, 132), and the switching inverter 140 (e.g., including the inverter switching devices Q1-Q4 individually connected as shown in FIG. 2 between a respective one of the first and second DC link nodes 131, 132 and the respective power stage output 104).

Figure 8:
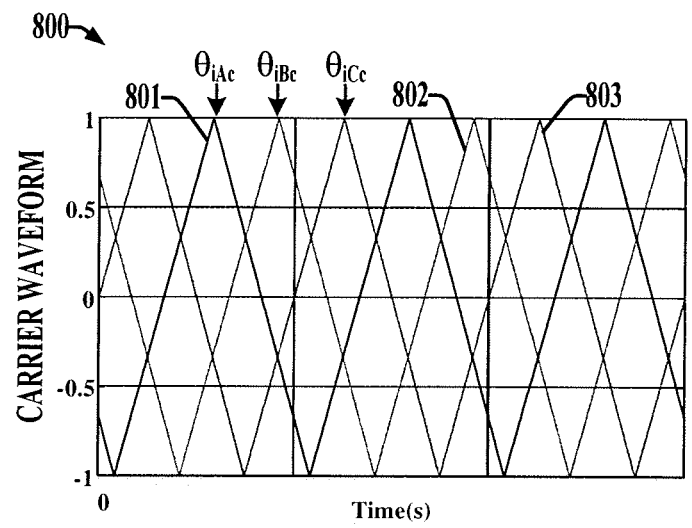
FIG. 8 is a signal diagram.

As discussed above in connection with FIGS. 1 and 2, the power stage controller 200 in FIG. 2 provides the rectifier switching control signals 103 to operate the rectifier switching devices S1-S6, and provides the inverter switching control signals 222 to operate the inverter switching devices Q1-Q4, and the phase controller 230 (e.g., a central AFE phase control component 230 in FIG. 1 and/or local AFE phase control components 230 in FIG. 2) controls the non-zero phase relationship between the rectifier switching control signals 103 of respective switching rectifiers 120 in the system 10 of FIG. 3. In one example, the phase controller 230 controls the non-zero phase relationships between carrier signals of the respective switching rectifiers 120 (e.g., signals 401, 402 and 402 in FIG. 4, signals 801, 802 and 803 in FIG. 8 below, and/or signals 1301, 1302, 1303, 1304, 1305 and 1306 in FIG. 13 below). In one example, the phase controller 230 provides the non-zero phase relationships between the carrier signals of the regenerative power stages 100 of each of the individual phase circuits 42 (e.g., signals 401, 402 and 403 in the graph 400 of FIG. 4) to eliminate or reduce a 31$^{st}$ order harmonic. In another example, the phase controller 230 provides the non-zero phase relationships between the carrier signals of the regenerative power stages 100 of each of the individual phase circuits 42 (e.g., signals 401, 402 and 403 in the graph 410 of FIG. 4) to eliminate or reduce a 35$^{th}$ order harmonic. In another example, the phase controller 230 provides the non-zero phase relationships between the carrier signals of the regenerative power stages 100 of each of the individual phase circuits 42 (e.g., signals 401, 402 and 403 in the graph 420 of FIG. 4) to eliminate or reduce the 31$^{st}$ and 35$^{th}$ order harmonics.

The controller 200 (FIG. 1) is used in the system 10 of FIG. 3, and operates in one of two modes, including a first mode (MOTORING), and a second mode (REGENERATION). In this example, the respective switching inverters 140 operate according to respective ones of the inverter switching control signals 222 in the first mode to convert power from the DC link circuit 130 to provide the output voltage $V_{OUT}$ having an amplitude of one of at least two discrete levels at the respective output 104, and in the second mode to transfer power from the respective output 104 to the DC link circuit 130. In addition, the respective switching rectifiers 120 operate according to respective ones of the rectifier switching control signals 103 in the first mode to convert power from the respective one of the secondary circuits 34 to provide power to the DC link circuit 130, and in the second mode to transfer power from the DC link circuit 130 to the respective one of the secondary circuits 34.

The use of the switching rectifier 120 facilitates regenerative operation of the system 10. In addition, the non-zero phase relationships of the carrier signals of the respective active rectifier circuits 120 facilitates controlled harmonic reduction to avoid or mitigate the need for large power stage filters 110, and potentially mitigates the need for a trap filter 300. In particular, the example of FIG. 3 reduces the size and complexity of the power stage filters, where the illustrated example includes a single in-line inductor in each phase of the respective power stages 100. This example includes the trap filter 300, but other examples (e.g., FIGS. 7, 12 and 14) do not include trap filters. For the three phase AFE 120 of FIG. 3, the selective non-zero phase relationship facilitates eliminating the LCL power stage filter if carrier signals within each power stage C are shifted properly, and the trap filter 300 is added at the front of the transformer 30. Alternatively the trap filter could be added through an additional secondary winding (not shown). A further improvement of the design, eliminates the need for the trap filter 300.

The following table shows minimum inductor (L) filter comparison under different rectifier switching frequencies with a 1100 VDC bus voltage.

| Switching frequency (Hz) | L$_1$ | TDD_P Max = 5% | TDD_S Max = 20% | 31$^{st}$ harmonic | 35$^{th}$ harmonic | 48$^{th}$ harmonic | Satisfy |
|---|---|---|---|---|---|---|---|
| 1980 | 9.9% | 3.37% | 5.01% | 2.24% | 1.97% | — | No |
| 3000 | 9.9% | 2.27% | 3.63% | — | — | 1.44% | No |
| 4020 | 3.08% | 4.98% | 7.24% | — | — | — | Yes |
| 9900 | 2.6% | 2.25% | 3.8% | — | — | — | Yes |

The following table shows a comparison with a 1100 VDC bus voltage and 1980 Hz rectifier switching frequency.

| LCL Type | L1(pu) | L2(pu) | Cf(pu) | Rf(pu) | TDD_pri | TDD_sec | Standard Satisified |
|---|---|---|---|---|---|---|---|
| Conventional LCL | 27.2% | 4.65% | 11.8% | 19.35% | | | NO The DC bus constraints cannot be met |

-continued

| LCL Type | L1(pu) | L2(pu) | Cf(pu) | Rf(pu) | TDD_pri | TDD_sec | Standard Satisified |
|---|---|---|---|---|---|---|---|
| LCL (Case 1) | 6.69% | 2.42% | 38.4% | 12.86% | 3.48% | 7.41% | Yes |
| LCL (Case 2) | 6.2% | 6.07% | 18.8% | 14.24% | 1.25% | 2.19% | Yes |

The indicated Case 1 in the above table indicates weights on the inductors, and Case 2: introduces more weights on the capacitors. As discussed above, however, the use of LCL power stage filters significantly increases the size, weight and space of the system 10, and an the illustrated three-phase example involves 18 inductors and 9 capacitors for a 7 level Regen CHB drive. To facilitate regeneration ability while satisfying grid harmonic requirements according to IEEE STD 519 2014, a different power stage filter 110 is used to shrink the size of the designed filter with the help of the carrier shifted method among different regenerative power stages 100.

As is shown in FIG. 3, the phase shifting angle of the phase shifting transformer is δ1, δ2, δ3 (negative means lagging, positive mean ahead). Assume the grid frequency is, the SPWM carrier frequency ratio is N. The carrier initial angles for A1, A2, and A3 are θ1Ac, θ2Ac, θ3Ac. The phase B and C follow the same carrier initial angle sequence. The power stage filter 110 in FIG. 3 reduces the switching sideband harmonics at N−2 and N+2 order. As is shown in FIG. 4, the carrier waveforms 401, 402 and 403 between the regenerative power stages 100 in the same phase circuits 42 are shifted to eliminate one harmonic. Moreover, the trap filter 300 on the primary side of the transformer reduces another harmonic component.

For an L-level system, there are m=(L−1)/2 cascaded power stages 100 for each phase circuit 42. As shown in FIG. 3, where the transformer phase shifted angles form cascaded power stages 100 are $\delta_1, \delta_2, \ldots \delta_j, \ldots, \delta_m$ (negative means phase angle delay), the phase shifted angles for the respective power stage carrier signals are $\theta_{1xc}$, $\theta_{2xc}, \ldots, \theta_{mxc}$ (x is a respective one of the rectifier input phases denoted A, B, and C hereinafter). To eliminate the N−2 order switching sideband harmonic, a given one of the carrier-shifted angles within A, B and C phase satisfies the equation (1).

$$\sum_{j=1}^{m} \cos((N-2)\omega_o t + \theta_{jxc} - 3\delta_j)) = 0 \quad (1)$$

The similar equation (2) among one phase could be drawn for eliminating the N+2 order harmonic.

$$\sum_{j=1}^{m} \cos((N+2)\omega_o t + \theta_{jxc} + 3\delta_j)) = 0 \quad (2)$$

For example, for the seven-level regenerative system 10 in FIG. 3, assuming N=33, $\delta_1$=−20°, $\delta_2$=0°, $\delta_3$=20°, the equations (1) and (2) become the following equations (3) and (4).

$$\cos(31\omega_o t + \theta_{1xc} + 60°) + \cos(31\omega_o t + \theta_{2xc}) + \cos(31\omega_o t + \theta_{3xc} - 60°) = 0 \quad (3)$$

$$\cos(35\omega_o t + \theta_{1xc} - 60°) + \cos(35\omega_o t + \theta_{2xc}) + \cos(35\omega_o t + \theta_{3xc} + 60°) = 0 \quad (4)$$

If N=33, then to eliminate the $31^{st}$ order harmonics, one solution of equation (3) is $\theta_{1xc}$=60°, $\theta_{2xc}$=0°, $\theta_{3xc}$=−60° (x=A, B, and C phase). To eliminate the $35^{th}$ order harmonics, one solution of equation (4) is $\theta_{1xc}$=−60°, $\theta_{2xc}$=0°, $\theta_{3xc}$=60° (x=A, B, and C phase). Once one harmonic component is removed through the carrier shifted operation, another harmonic component can be removed by the trap filter 300. Furthermore, to eliminate both the $31^{st}$ and $35^{th}$ order harmonics, one solution of the equations (3) and (4) is $\theta_{1xc}$=180°, $\theta_{2xc}$=0°, $\theta_{3xc}$=−180° (x=A, B, and C phase).

The following table shows example phase shift angles within one phase circuit 42 for the example seven level system 10 of FIG. 3, corresponding to the carrier signals shown in the graphs 400, 410 and 420 in FIG. 4.

|  | $\theta_{1xc}$ | $\theta_{2xc}$ | $\theta_{3xc}$ |
|---|---|---|---|
| Remove N − 2($31^{st}$) order (°) | 60 | 0 | −60 |
| Remove N + 2($35^{th}$) order (°) | −60 | 0 | 60 |
| Remove both N − 2 and N + 2 order (°) | 180 | 0 | −180 |

Similar equations and angles can be calculated for a nine level, three phase system, where N=33, $\delta_1$=−15°, $\delta_2$=0°, $\delta_3$=15°, $\delta_4$=30°, where the above equations (1) and (2) become the following equations (5) and (6).

$$\cos(31\omega_o t + \theta_{1xc} + 45°) + \cos(31\omega_o t + \theta_{2xc}) + \cos(31\omega_o t + \theta_{3xc} - 45°) + \cos(31\omega_o t + \theta_{4xc} - 90°) = \quad (5)$$

$$\cos(35\omega_o t + \theta_{1xc} - 45°) + \cos(35\omega_o t + \theta_{2xc}) + \cos(35\omega_o t + \theta_{3xc} + 45°) + \cos(35\omega_o t + \theta_{4xc} + 90°) = \quad (6)$$

The following table shows another example carrier shifted operation within one phase for a seven level system.

|  | $\theta_{1xc}$ | $\theta_{2xc}$ | $\theta_{3xc}$ | $\theta_{4xc}$ |
|---|---|---|---|---|
| Remove N − 2($31^{st}$) order (°) | 135 | 0 | 135 | 0 |
| Remove N + 2($35^{th}$) order (°) | −135 | 0 | −135 | 0 |

$\theta_{1xc}$, $\theta_{2xc}$, $\theta_{3xc}$, $\theta_{4xc}$ can also be calculated for a nine level system to minimize both the $31^{st}$ and $35^{th}$ order harmonics.

The following describes voltage and current operation of an example first AFE phase (e.g., phase A) in the system 10 in FIG. 3 using the trap filter 300 and the carrier phase shifting of power stages 100 within the example phase.

$$v_{1a} = \frac{MV_{dc}}{2}\cos(\omega_0 t - 20) + \frac{2V_{dc}}{\pi}J_{-2}\left(\frac{\pi}{2}M\right)\cos(31\omega_0 t + \theta_{1c} + 40)$$

$$I_{1a} = I_1\cos(\omega_0 t - 20 - \alpha) + I_{31}\cos(31\omega_0 t + \theta_{1c} + 40 - \beta)$$

$$v_{2a} = \frac{MV_{dc}}{2}\cos(\omega_0 t) + \frac{2V_{dc}}{\pi}J_{-2}\left(\frac{\pi}{2}M\right)\cos(31\omega_0 t + \theta_{2c})$$

$$I_{2a} = I_1\cos(\omega_0 t - \alpha) + I_{31}\cos(31\omega_0 t + \theta_{2c} - \beta)$$

$$v_{3a} = \frac{MV_{dc}}{2}\cos(\omega_0 t + 20) + \frac{2V_{dc}}{\pi}J_{-2}\left(\frac{\pi}{2}M\right)\cos(31\omega_0 t + \theta_{3c} - 40)$$

$$I_{3a} = I_1\cos(\omega_0 t + 20 - \alpha) + I_{31}\cos(31\omega_0 t + \theta_{3c} - 40 - \beta)$$

$$I_A = 3I_{1A}\cos(\omega_0 t - \alpha) + I_{31A}(\cos(31\omega_0 t + \theta_{1c} + 60 - \beta) + \cos(31\omega_0 t + \theta_{2c} - \beta) + \cos(31\omega_0 t + \theta_{3c} - 60 - \beta))$$

$\theta_{1c}$, $\theta_{2c}$ and $\theta_{3c}$ are the carrier phase angle for the phase A cells. In order to remove the 31$^{st}$ order harmonic:

$$\cos(31\omega_0 t+\theta_{1c}+60-\beta)+\cos(31\omega_0 t+\theta_{2c}-\beta)+\cos(31\omega_0 t+\theta_{3c}-60-\beta)=0$$

One solution is
$\theta_{1c}=60°$
$\theta_{2c}=0°$
$\theta_{3c}=-60°$

In order to remove the 35th order harmonic.

Figure 5:
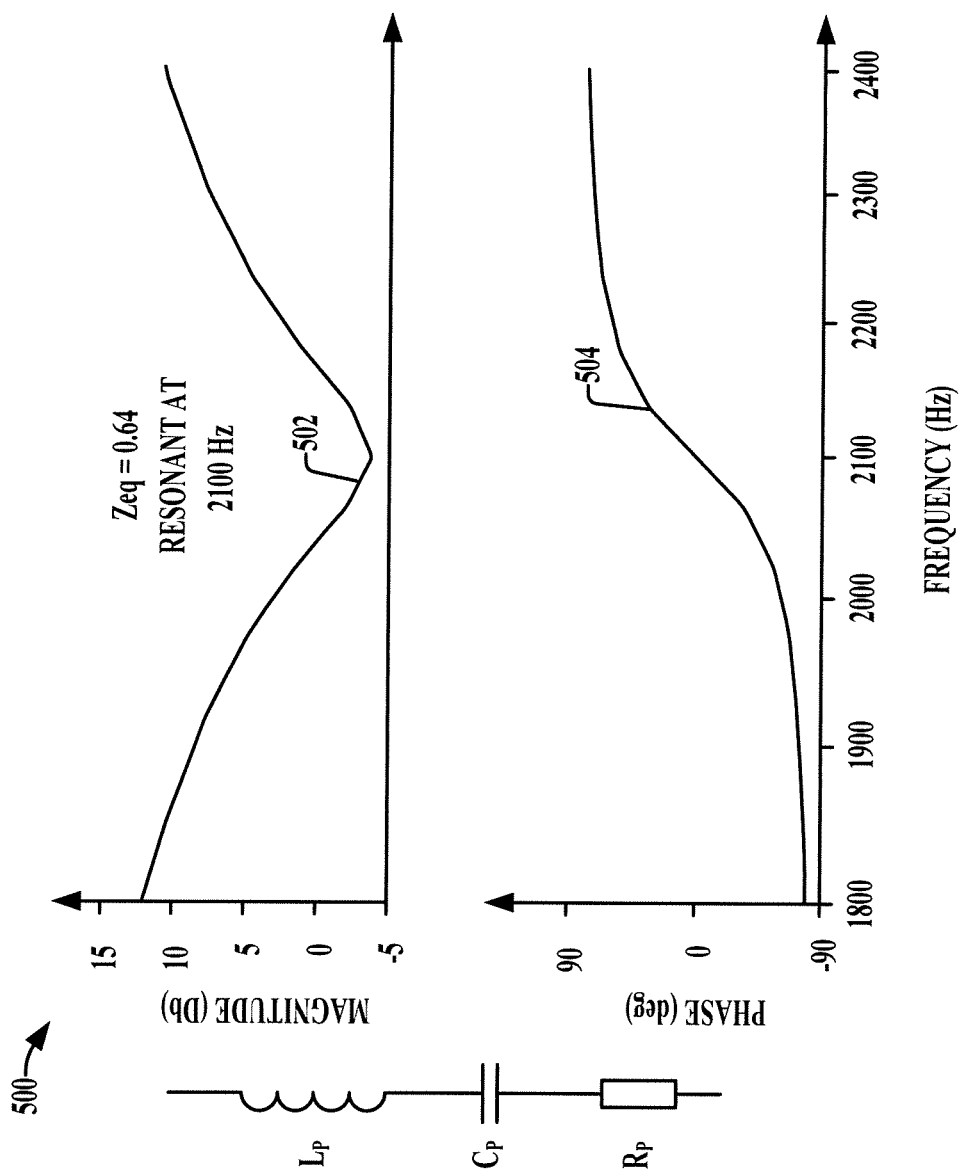
FIG. 5 is a signal diagram.

FIG. 5 shows an example graph 500 with a magnitude curve 502 and a phase curve 504 showing the frequency response to the example trap filter 300 in one example with the following LCL filter parameters using damping resistors in each filter phase.

| Frequency | $L_p$(pu) | $C_p$(pu) | $R_p$(pu) |
|---|---|---|---|
| 1980 | 2.84% | 2.82% | 4.95% |

Figure 6:
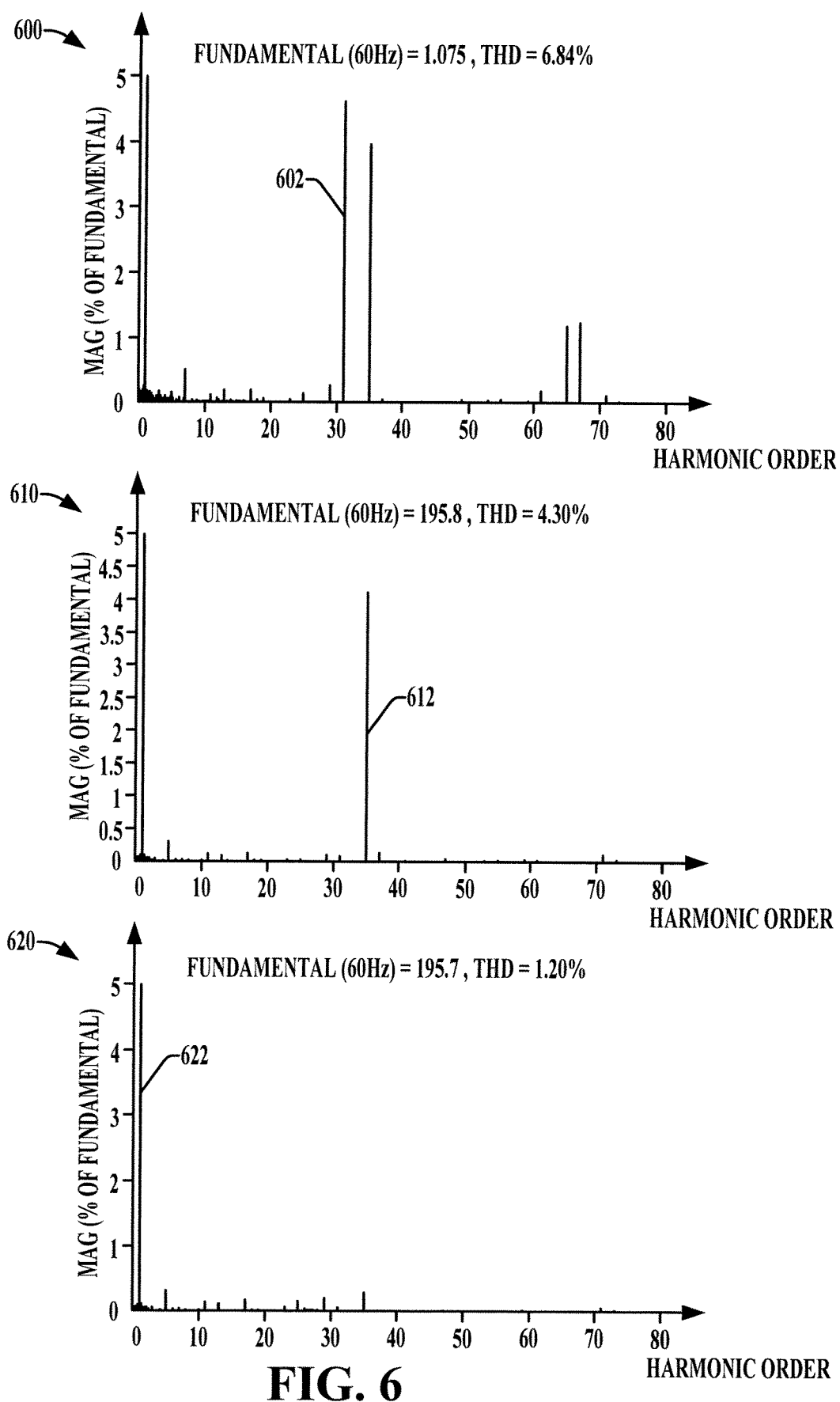
FIG. 6 is a signal diagram.

FIG. 6 shows a graph 600 with a frequency spectrum curve 602 representing the harmonic content order on the secondary side of the transformer 30, a graph 610 with a frequency spectrum curve 612 representing the harmonic content order before the trap filter 300, and a graph 620 with a frequency spectrum curve 622 representing the harmonic content order at the power source 20.

Referring now to FIGS. 7-11, another example of the system 10 is illustrated and described, with the trap filter removed, and the active front-end switching rectifier carrier signal phase control modified to also provide a non-zero phase relationship between corresponding power stages 100 of the different phase circuits 42. As seen in the system 10 of FIG. 7, each of the phase circuits 42 includes an integer number m regenerative power stages 100 with respective power stage outputs 104 connected (e.g., as shown in FIG. 1) in series between the neutral node N and a respective phase circuit output node U, V, W, where m is greater than 2 (e.g., m=3 in the example of FIG. 7). The first regenerative power stage 100-U1, 100-V1, 100-W1 of each of the phase circuits 42-U, 42-V, 42-W is connected to the neutral node N, and the m$^{th}$ (e.g., third) power stage 100-U1, 100-V1, 100-W1 of each of the phase circuits 42-U, 42-V, 42-W is connected to the respective phase circuit output node U, V, W. The phase controller 230 in this example provides the non-zero phase relationships between the carrier signals (e.g., signals 801, 802 and 803 in the graph 800 of FIG. 8) of the i$^{th}$ regenerative power stages 100-U1, 100-V1, 100-W1 of the respective phase circuits 42-U, 42-V, 42-W, for i=1, ..., m.

Figure 9:
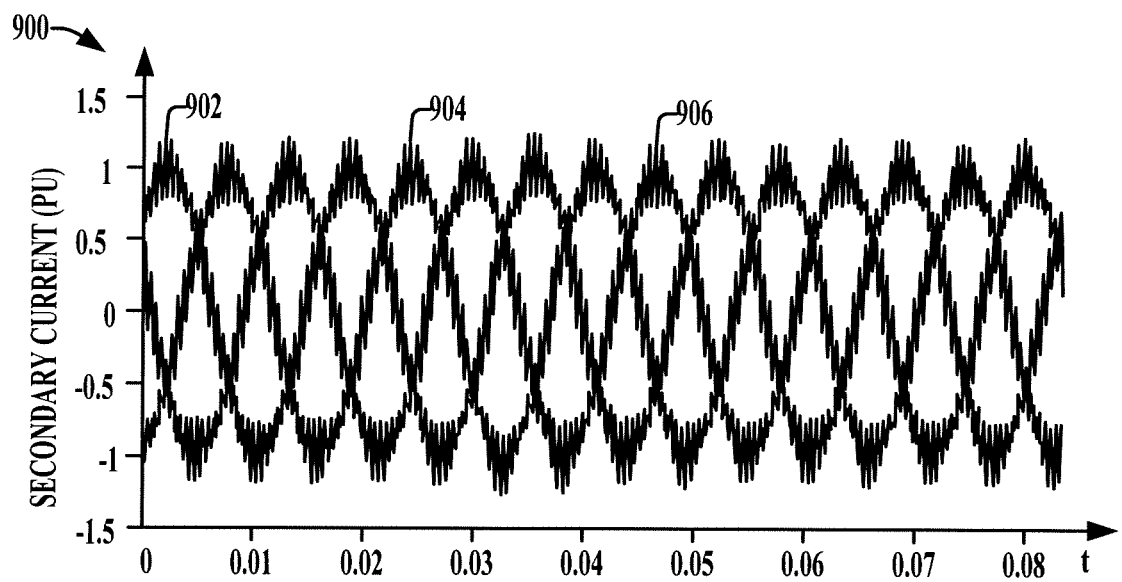
FIG. 9 is a signal diagram.
Figure 10:
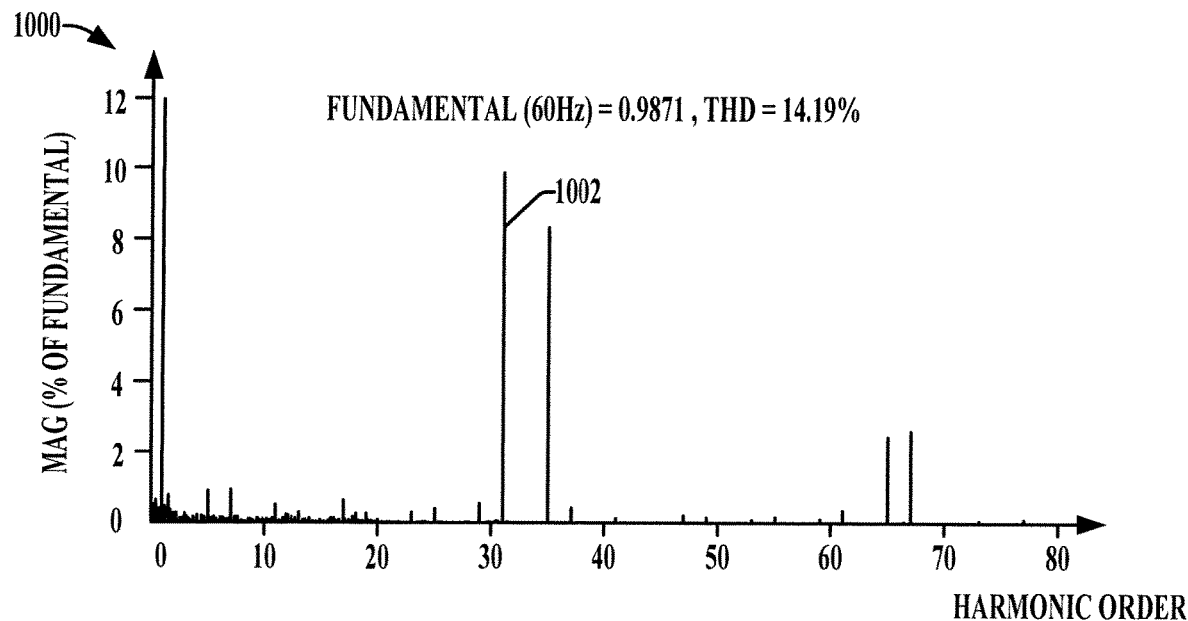
FIG. 10 is a signal diagram.
Figure 11:
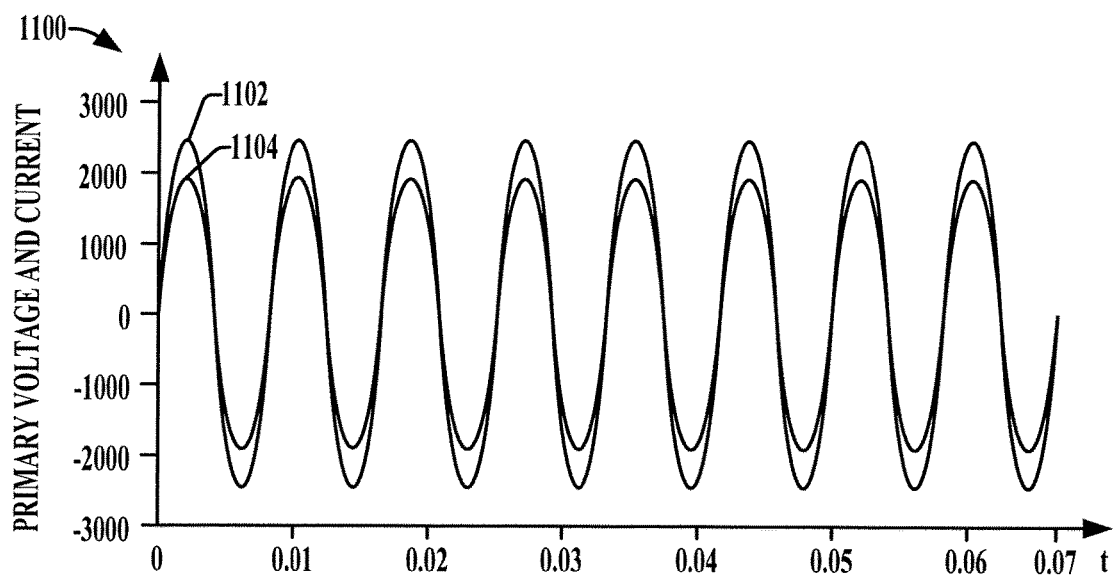
FIG. 11 is a signal diagram.

The example of FIG. 7 reduces or removes both sideband harmonics using a non-zero carrier signal phase shift between voltages of each similar (e.g., corresponding) cell in the three phase circuits 42. For example, the carrier signals of the first power stages 100-U1, 100V1, and 100-W1 are phase shifted by a non-zero phase angle from one another, the carrier signals of the power stages 100-U2, 100V2, and 100-W2 are phase shifted by a non-zero phase angle from one another, and the carrier signals of the final (e.g., m$^{th}$) power stages 100-U2, 100V2, and 100-W2 are phase shifted by a non-zero phase angle from one another. This example facilitates operation to satisfy relevant harmonic content standards without a trap filter, and only using a minimum single inductor power stage filter 110. Both N−2, N+2, 2N−1, and 2N+1 sideband harmonics could be reduced by adopting 120-degree carrier phase shifting angle among three phase $A_j$, $B_j$, $C_j$ (j=1 ... m), as shown by the curves 801, 802, and 803 in the graph 800 of FIG. 8. FIG. 9 shows secondary current curves 902, 904, and 906 as a function of time for the example system 10 of FIG. 7 using the carrier waveforms of FIG. 8. FIG. 10 provides a graph 1000 with a frequency spectrum curve 1002 representing the harmonic content order on the secondary side of the transformer 30, and FIG. 11 shows a graph 1100 with curves 1102 and 1104 respectively showing voltage and current (times 10) of the transformer primary 32 for the example system 10 of FIG. 7. In a general case, for a three phase L level regenerative system, to eliminate the N−2, N+2, 2N−1, and 2N+1 sideband harmonics for the three phase regenerative CHB system, the SPWM (e.g., space factor pulse width modulation) carrier phase shifting angles for regenerative cells $A_j$, $B_j$, $C_j$ (j=1 ... m) in one example satisfy the following equation (7) for any frequency ω.

$$\cos(\omega t+\theta_{jAc})+\cos(\omega t+\theta_{jBc})+\cos(\omega t+\theta_{jCc})=0 \quad (7)$$

For example, for a three phase seven-level regenerative system N=33. To eliminate the 31$^{st}$, 35$^{th}$, 65$^{th}$, and 67$^{th}$ order harmonics, suitable carrier phase shifting angles between regenerative cells A1, B1 and C1 can be 120° respectively, as shown in the following table.

|  | $\theta_{jAc}$ | $\theta_{jBc}$ | $\theta_{jCc}$ |
|---|---|---|---|
| Carrier shifted Angles (°) | 120 | 0 | −120 |

Figure 13:
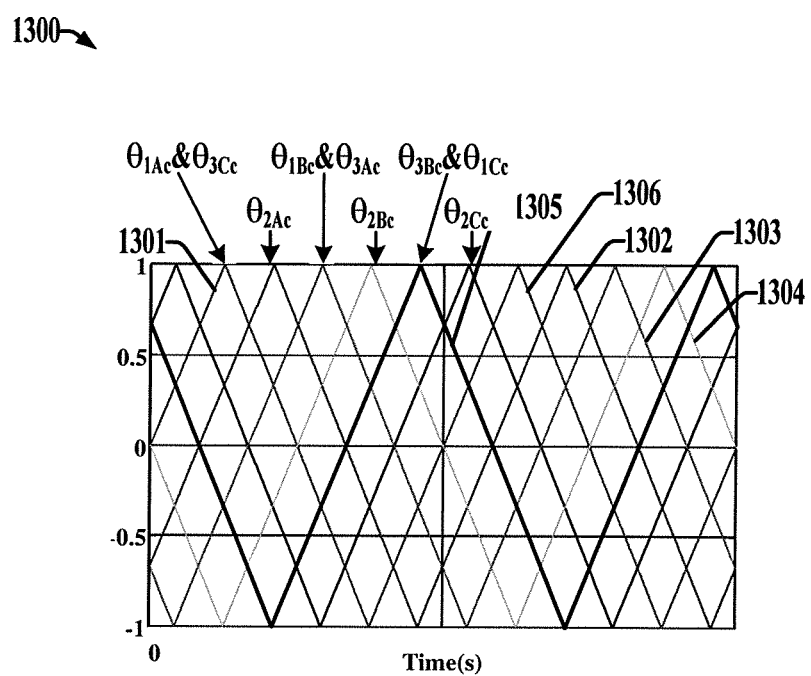
FIG. 13 is a signal diagram.

Referring also to FIGS. 12 and 13, FIG. 12 shows another example of the system 10, in which the phase control circuit 230 (e.g., FIG. 1) controls the non-zero carrier signal phase relationship between the individual power stages 100 of the individual phase circuits 42, and additionally controls a non-zero carrier signal phase relationship between the corresponding power stages 100 of all the individual phase circuits 42 (e.g., combining the carrier phase shift control approach of FIG. 3 with the approach of FIG. 7 above). As in the example of FIG. 7 above, no trap filter is included, and the primary circuit 32 of the transformer 30 is connected directly to a power source 20, and the individual power stages 100 include a filter circuit 110 connected between the respective switching rectifier 120 and the respective one of the secondary circuits 34. In one example, the filter circuit 110 includes inductors L individually having a first terminal connected directly to a respective individual phase line of the respective one of the secondary circuits 34 and a second terminal connected directly to a respective phase line of the respective switching rectifier 120.

The combined phase shift control in the example of FIGS. 12 and 13 reduce both N−2, N+2, 2N−1, 2N+1, 3N−2 and 3N+2 sideband harmonics by adopting carrier phase shifting angle among three phase $A_j$, $B_j$, and $C_j$ (j=1 ... m m cells per phase). In one example, the carrier signal phase shift control reduces the rectifier switching sideband around the 99$^{th}$ order harmonic, which may be difficult using only the technique of FIG. 7 without adding a notch trap filter at the primary side of the transformer 30. The example in FIG. 12 adds 60 degree carrier angle shifts between the power stages 100 of the same phase circuit 42. FIG. 13 provides a graph 1300 with curves 1301, 1302, 1303, 1304, 1305, and 1306 showing the carrier signals in the example of FIG. 12. To eliminate the 3N−2 order switching sideband harmonic, the chosen of the carrier-shifted angles in one example satisfy the following equation (8) and (9), where x can be A, B and C phase.

$$\sum_{j=1}^{m} \cos((3N-2)\omega_o t + 3\theta_{jxc} - 3\delta_j)) = 0 \quad (8)$$

The similar equation could be drawn for eliminating 3N+2 order harmonic.

$$\sum_{j=1}^{m} \cos((3N+2)\omega_o t + 3\theta_{jxc} + 3\delta_j)) = 0 \qquad (9)$$

For example, for the seven-level regenerative system 10 in FIG. 12, with N=33, $\delta_1=-20°$, $\delta_2=0°$, and $\delta_3=20°$, the equations (8) and (9) become the following equations (10) and (11).

$$\cos(97\omega_o t + 3\theta_{1xc} + 60°) + \cos(97\omega_o t + 3\theta_{2xc}) + \cos(97\omega_o t + 3\theta_{3xc} - 60°) = 0 \qquad (10)$$

$$\cos(101\omega_o t + 3\theta_{1xc} - 60°) + \cos(101\omega_o t + 3\theta_{2xc}) + \cos(101\omega_o t + 3\theta_{3xc} + 60°) = 0 \qquad (11)$$

To eliminate both 3N−2 and 3N+2 order harmonics (e.g., $97^{th}$ and $101^{st}$ order harmonics), one solution of equations (10 and (11 is $\theta_{1xc}=60°$, $\theta_{2xc}=0°$, $\theta_{3xc}=-60°$ (x=A, B, and C phase), using phase shift of 60 degrees between cell A1, A2, and A3. The following table shows example phase shift values corresponding to the curves 1301, 1302, 1303, 1304, 1305, and 1306 in FIG. 13 for a 7-level system in FIG. 12.

| $\theta_{1Ac}$ | $\theta_{2Ac}$ | $\theta_{3Ac}$ | $\theta_{1Bc}$ | $\theta_{2Bc}$ | $\theta_{3Bc}$ | $\theta_{1Cc}$ | $\theta_{2Cc}$ | $\theta_{3Cc}$ |
|---|---|---|---|---|---|---|---|---|
| Degree(°) 0 | 60 | 120 | 120 | 180 | 240 | 240 | 300 | 0 |

For a three phase seven-level regenerative CHB system N=33, to eliminate both $97^{th}$ and $101^{st}$ order harmonics, the carrier phase shifting angles between regenerative cells A1, A2 and A3 is 60 degrees, and the carrier phase shifted angles between regenerative cells A1, B1 and C1 is 120 degrees.

Figure 14:
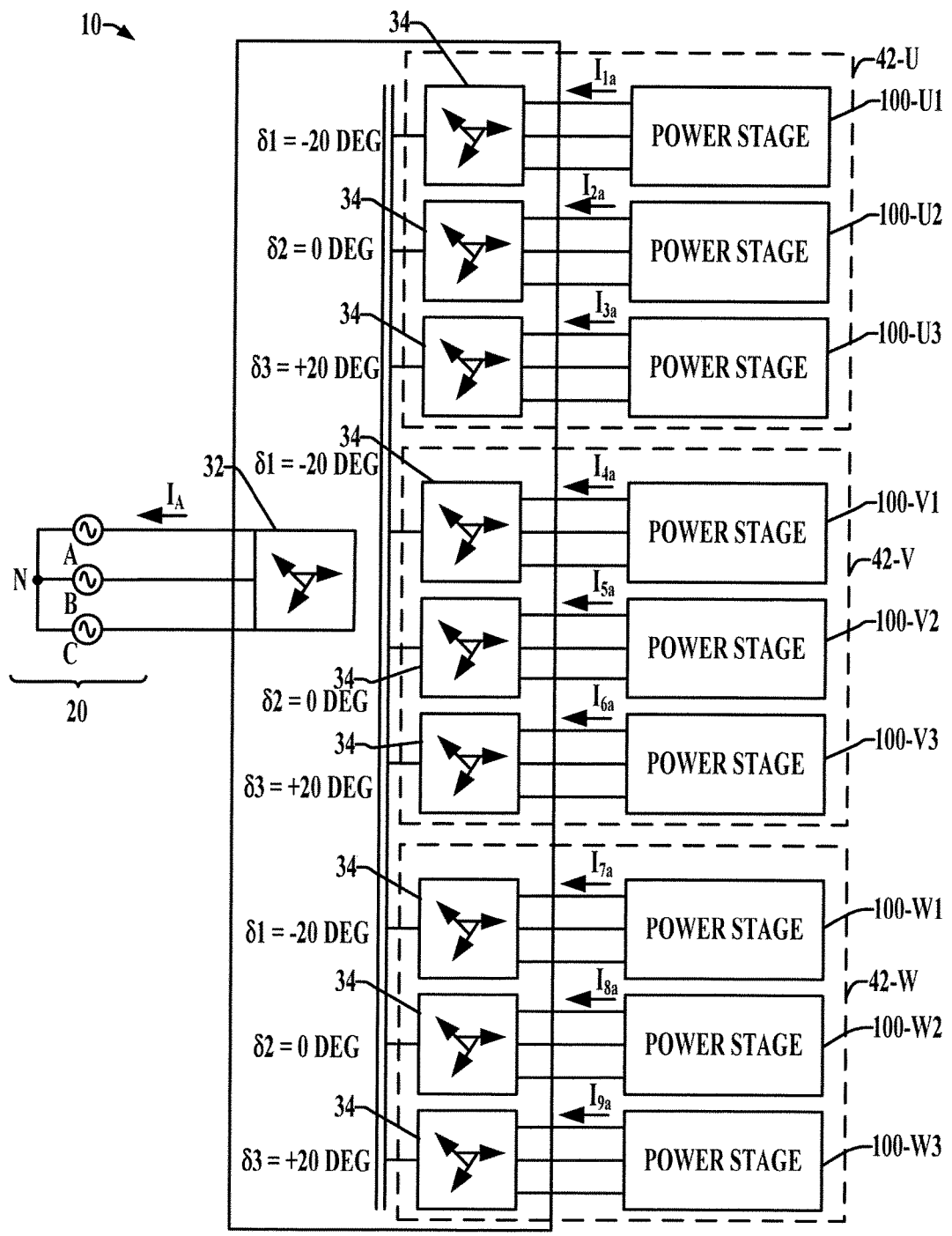
FIG. 14 is a schematic diagram.

Referring also to FIGS. 14-17, another example of the system 10 is shown in FIG. 14, in which the phase control circuit 230 (e.g., FIG. 1 above) combines the use of carrier signal phase shifting within the individual phase circuits 42 and across phase circuits 42. In one example, this can be used to address current harmonics above the $50^{th}$ order, for example, to meet IEEE std 519 states that above $50^{th}$ order should be constrained as low as possible according to the different applications. This example does not require any extra trap filter but remove or reduces the higher switching sideband at the $95^{th}$, $97^{th}$, $101^{st}$ and $103^{rd}$ order harmonics. In this example, the phase shift controller 230 uses 60° carrier phase shift angles among same phase circuit power stages 100, and uses 120° carrier phase shift among 20° lagging cells. In one example, for the nine (9) power stages 100 in FIG. 14, beginning from top to bottom referenced as 1-9, respectively, the following table shows example carrier phase shift angles for the cells 1-9 (also shown as stage table 1400 in FIG. 14).

| Cell | 1 | 2 | 3 | 4 | 5 | 6 | 7 | 8 | 9 |
|---|---|---|---|---|---|---|---|---|---|
| PS_Angle (°) | 0 | 60 | 120 | 120 | 180 | 240 | 240 | 300 | 0 |

Figure 15:
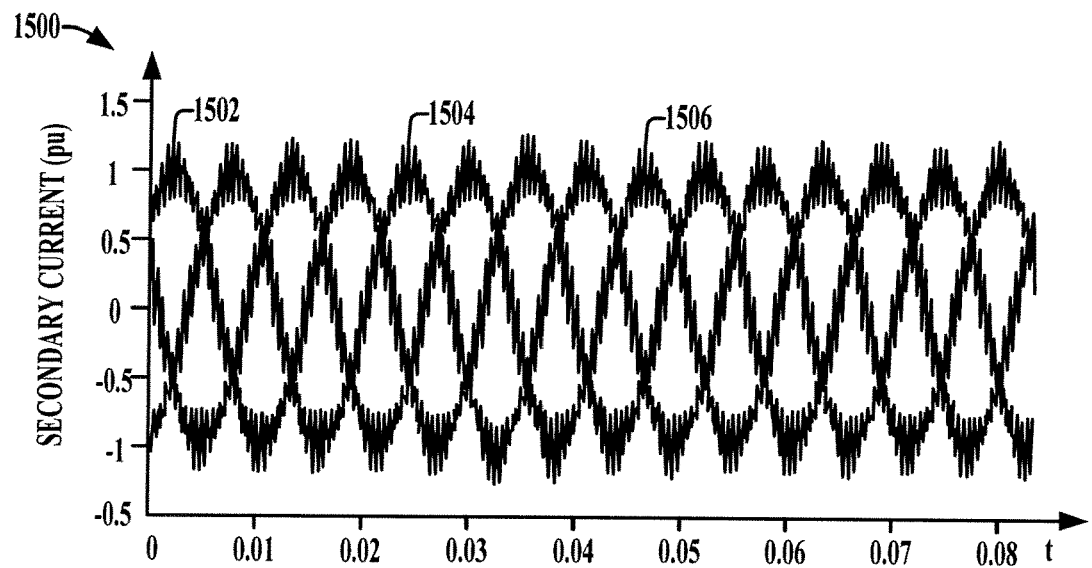
FIG. 15 is a signal diagram.
Figure 16:
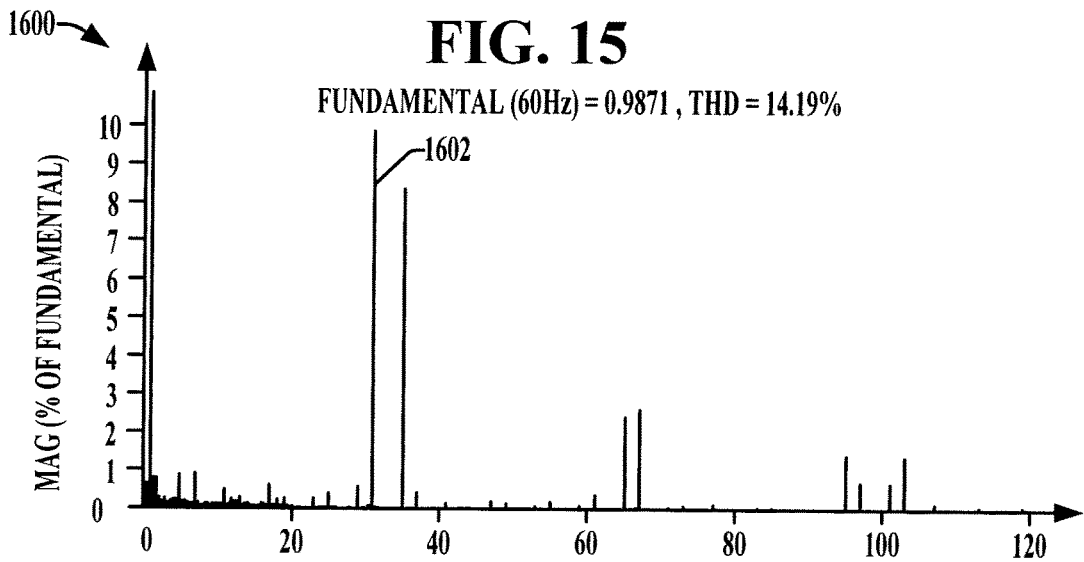
FIG. 16 is a signal diagram.
Figure 17:
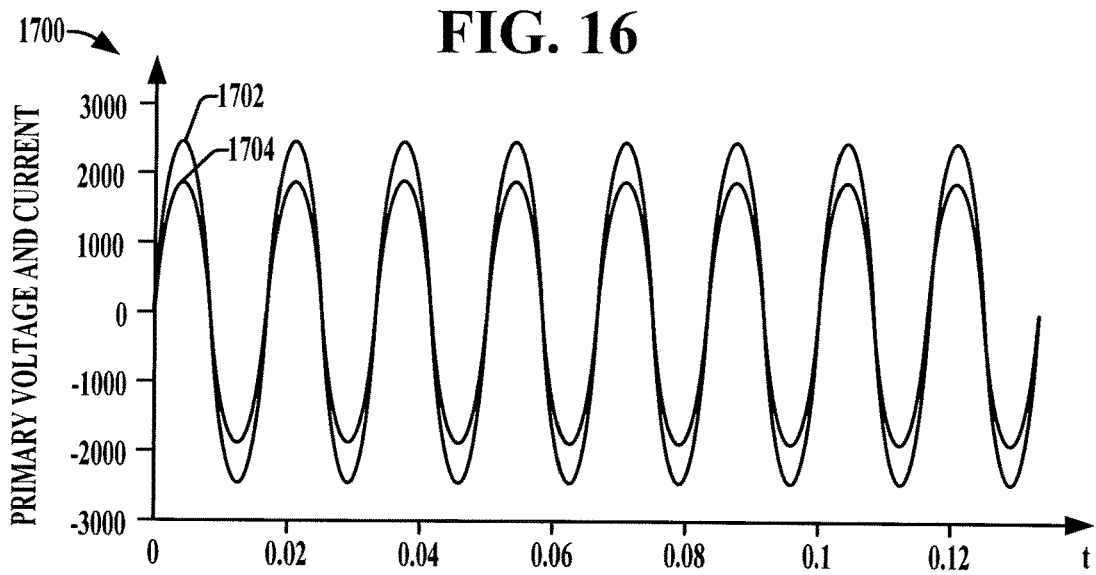
FIG. 17 is a signal diagram.

FIG. 15 shows a graph 1500 with secondary current curves 1502, 1504, and 1506 for the corresponding three phases of the system 10 in FIG. 14 over time using the power stage phase shift angle shown in the above table. FIG. 16 provides a frequency spectrum graph 1600 with a magnitude curve 1602 for this example, and FIG. 17 shows a graph 1700 with voltage and current curves 1702 and 1704, respectively, for the example system 10 of FIG. 14.

The following table provides a comparison of use of an LCL power stage filter, with the carrier signal phase shifting within the individual phase circuits 42 with a trap filter 300 (e.g., Method 1), as well as a comparison with the use of carrier signal phase shifting across phase circuits 42 (Method 2), and also comparison with the use of carrier signal phase shifting within the individual phase circuits 42 and across phase circuits 42 (Method 3).

| Filter Type | L1 | Rf | Cr | L2 | L2 | Lp | Cp | Rp | Lg TDD-P_ Max = 5% | TDD_S Max = 20% | $31^{st}$ harmonic | $35^{th}$ harmonic $97^{th}$ clean spectrum | $97^{th}$ clean spectrum | Satisfy std519 |
|---|---|---|---|---|---|---|---|---|---|---|---|---|---|---|
| L | 9.9% | — | — | — | — | — | — | — | 3.37% | 5.01% | 2.24% | 1.97% | | No |
| LCL GA (case 1) Large Cap. | 6.69% | 12.9% | 38.4% | 2.4% | — | — | — | — | 3.48% | 7.41% | 0.39% | 0.29% | | Yes |
| LCL GA (case 2) Smaller Cap. | 6.2% | 14.2% | 18.8% | 6.1% | — | — | — | — | 1.4% | 2.2% | | 0.3% | | Yes |
| Proposed Method 1 (L + PS ontroller + Trap Filter) | 5.87% | — | — | — | 208% | 2.8% | 4.9% | 2% | 1.2% | 6.85% | | 0.3% | Yes | Yes |
| Proposed Method 2 (L with PS Controller) | 1.47% | — | — | — | — | — | — | — | 1.86% | 14.17% | — | — | No | Yes |
| Proposed Method 3 (L with PS Controller) | 1.47% | — | — | — | — | — | — | — | 1.17% | 14.17% | — | — | Yes | Yes |
| Proposed Method 3 (Induction Machine) | 3.6% | | | | | | | | 2.17% | 11.12% | | | Yes | Yes |

Described examples also include methods and non-transitory computer readable mediums with computer executable program instructions which, when executed by a processor, cause the processor to implement a method to control a multiphase multilevel regenerative power converter, such as the example converter 40 above with multilevel phase circuits 42 that individually include multiple regenerative power stages 100 with respective power stage outputs 104 connected in series, the individual power stages 100 comprising a DC link circuit 130 a switching rectifier 120 coupled between a respective transformer secondary circuit 34 and the DC link circuit 130, and a switching inverter 140 coupled between the DC link circuit 130 and the respective power stage output 104. The methods in one example include providing inverter switching control signals 222 to control the respective switching inverters 140, providing rectifier switching control signals 103 to control the respective switching rectifiers 120, and controlling a non-zero phase relationship between the rectifier switching control signals 103 of the respective switching rectifiers 120. In one example, controlling the non-zero phase relationship between the rectifier switching control signals 103 of the respective switching rectifiers 120 includes controlling non-zero phase relationships between carrier signals (e.g., signals 401, 402, 402, 801, 802, 803, 1301, 1302, 1303, 1304, 1305, 1306 above) of the respective switching rectifiers 120. In one example, moreover, controlling the non-zero phase relationship between the rectifier switching control signals 103 of the respective switching rectifiers 120 includes providing non-zero phase relationships between carrier signals of the regenerative power stages 100 of each of the individual phase circuits 42.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
   a transformer, including a primary circuit and a plurality of secondary circuits;
   a multiphase multilevel regenerative power converter, including three or more multilevel phase circuits, each of the three or more multilevel phase circuits including multiple regenerative power stages with respective power stage outputs connected in series, each of the multiple regenerative power stages comprising:
      a DC link circuit including at least one capacitor coupled between first and second DC link nodes,
      a switching rectifier, including rectifier switching devices individually coupled between a respective one of the secondary circuits and a respective one of the first and second DC link nodes,
      a switching inverter including inverter switching devices individually coupled between a respective one of the first and second DC link nodes and the respective power stage output, and
      a power stage controller configured to provide rectifier switching control signals to operate the rectifier switching devices, and to provide inverter switching control signals to operate the inverter switching devices; and
   a phase controller configured to control a non-zero phase relationship between the rectifier switching control signals of respective switching rectifiers to reduce one or more sideband harmonics, wherein controlling the non-zero phase relationship between the rectifier switching control signals of respective switching rectifiers includes controlling non-zero phase relationships between carrier signals of the respective switching rectifiers, and wherein the one or more sideband harmonics comprise harmonics at N−2 order and harmonics at N+2 order, wherein N is a carrier frequency ratio of the carrier signals determined based on space factor pulse width modulation.

2. The power conversion system of claim 1, wherein the phase controller is configured to reduce one or more first sideband harmonics using a first carrier phase shifting angle and reduce one or more second sideband harmonic using a second carrier phase shifting angle.

3. The power conversion system of claim 1, wherein each of the regenerative power stages further includes a filter circuit connected between the respective switching rectifier and the respective one of the secondary circuits, and wherein the filter circuit includes inductors individually having a first terminal connected directly to a respective individual phase line of the respective one of the secondary circuits and a second terminal connected directly to a respective phase line of the respective switching rectifier.

4. The power conversion system of claim 1,
   wherein each of the phase circuits includes an integer number m regenerative power stages with respective power stage outputs connected in series between a neutral node and a respective phase circuit output node, m being greater than 2;
   wherein a first regenerative power stage of each of the phase circuits is connected to the neutral node, and an mth power stage of each of the phase circuits is connected to the respective phase circuit output node; and
   wherein the phase controller is configured to provide the non-zero phase relationships between the carrier signals of the ith regenerative power stages of the respective phase circuits, for i=1, . . . , m.

5. The power conversion system of claim 1, wherein the phase controller is configured to provide non-zero phase relationships between carrier signals of the regenerative power stages of each of the three or more multilevel phase circuits.

6. The power conversion system of claim 1, wherein the primary circuit of the transformer is connected directly to a power source.

7. The power conversion system of claim 6, further comprising a trap filter connected between the primary circuit of the transformer and the power source.

8. The power conversion system of claim 1,
wherein the respective switching inverters are configured to operate according to respective ones of the inverter switching control signals in a first mode to convert power from the DC link circuit to provide an output voltage having an amplitude of one of at least two discrete levels at the respective output, and in a second mode to transfer power from the respective output to the DC link circuit; and
wherein the respective switching rectifiers are configured to operate according to respective ones of the rectifier switching control signals in the first mode to convert power from the respective one of the secondary circuits to provide power to the DC link circuit, and in the second mode to transfer power from the DC link circuit to the respective one of the secondary circuits.

9. The power conversion system of claim 1, wherein the harmonics at N−2 order are reduced by applying a phase shifting angle 60° on a first phase of the carrier signals, a phase shifting angle 0 on a second phase of the carrier signals, and a phase shifting angle −60° on a third phase of the carrier signals.

10. The power conversion system of claim 1, wherein the harmonics at N+2 order are reduced by applying a phase shifting angle −60° on a first phase of the carrier signals, a phase shifting angle 0 on a second phase of the carrier signals, and a phase shifting angle 60° on a third phase of the carrier signals.

11. The power conversion system of claim 1, wherein the harmonics at N+2 order and the harmonics at N−2 order are both reduced by applying a phase shifting angle 180° on a first phase of the carrier signals, a phase shifting angle 0 on a second phase of the carrier signals, and a phase shifting angle −180° on a third phase of the carrier signals.

12. A method to control a multiphase multilevel regenerative power converter with multilevel phase circuits that individually include multiple regenerative power stages with respective power stage outputs connected in series, each of the multiple regenerative power stages comprising a DC link circuit a switching rectifier coupled between a respective transformer secondary circuit and the DC link circuit, and a switching inverter coupled between the DC link circuit and the respective power stage output, the method comprising:
providing inverter switching control signals to control the respective switching inverters;
providing rectifier switching control signals to control the respective switching rectifiers;
controlling a non-zero phase relationship between the rectifier switching control signals of the respective switching rectifiers to reduce one or more sideband harmonics, including controlling non-zero phase relationships between carrier signals of respective regenerative power stages wherein the one or more sideband harmonics comprise harmonics at N−2 order and harmonics at N+2 order, wherein N is a carrier frequency ratio of the carrier signals determined based on space factor pulse width modulation.

13. The method of claim 12, further comprising reducing one or more first sideband harmonics using a first carrier phase shifting angle and reducing one or more second sideband harmonic using a second carrier phase shifting angle.

14. The method of claim 12, wherein the harmonics at N−2 order are reduced by applying a phase shifting angle 60° on a first phase of the carrier signals, a phase shifting angle 0 on a second phase of the carrier signals, and a phase shifting angle −60° on a third phase of the carrier signals.

15. The method of claim 12, wherein the harmonics at N+2 order are reduced by applying a phase shifting angle −60° on a first phase of the carrier signals, a phase shifting angle 0 on a second phase of the carrier signals, and a phase shifting angle 60° on a third phase of the carrier signals.

16. The method of claim 12, wherein the harmonics at N+2 order and the harmonics at N−2 order are both reduced by applying a phase shifting angle 180° on a first phase of the carrier signals, a phase shifting angle 0 on a second phase of the carrier signals, and a phase shifting angle −180° on a third phase of the carrier signals.

17. A non-transitory computer readable medium with program instructions which, when executed by a processor, cause the processor to control a multiphase multilevel regenerative power converter with multilevel phase circuits that individually include multiple regenerative power stages with respective power stage outputs connected in series, each of the multiple regenerative power stages comprising a DC link circuit a switching rectifier coupled between a respective transformer secondary circuit and the DC link circuit, and a switching inverter coupled between the DC link circuit and the respective power stage output, the computer readable medium comprising computer instructions for:
providing inverter switching control signals to control the respective switching inverters;
providing rectifier switching control signals to control the respective switching rectifiers;
controlling a non-zero phase relationship between the rectifier switching control signals of the respective switching rectifiers to reduce one or more sideband harmonics including controlling a non-zero phase relationship between carrier signals of respective regenerative power stages wherein the one or more sideband harmonics comprise harmonics at N−2 order and harmonics at N+2 order, wherein N is a carrier frequency ratio of the carrier signals determined based on space factor pulse width modulation.

* * * * *